US006795905B1

(12) United States Patent
Ellison et al.

(10) Patent No.: US 6,795,905 B1
(45) Date of Patent: Sep. 21, 2004

(54) CONTROLLING ACCESSES TO ISOLATED MEMORY USING A MEMORY CONTROLLER FOR ISOLATED EXECUTION

(75) Inventors: Carl M. Ellison, Portland, OR (US); Roger A. Golliver, Beaverton, OR (US); Howard C. Herbert, Phoenix, AZ (US); Derrick C. Lin, San Mateo, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 437 days.

(21) Appl. No.: 09/672,603

(22) Filed: Sep. 29, 2000

(Under 37 CFR 1.47)

Related U.S. Application Data

(63) Continuation-in-part of application No. 09/540,608, filed on Mar. 31, 2000, now abandoned.

(51) Int. Cl.[7] ............................................. G06F 12/00
(52) U.S. Cl. ...................... 711/163; 711/121; 711/152; 711/165; 711/167; 711/170; 712/43; 712/229; 713/164; 713/166; 709/100
(58) Field of Search ................................. 711/163, 121, 711/152, 165, 167, 170; 712/43, 229; 713/164, 166; 709/100

(56) References Cited

U.S. PATENT DOCUMENTS

| 4,037,214 A | 7/1977 | Birney et al. |
| 4,278,837 A | 7/1981 | Best ........................ 178/22.09 |

(List continued on next page.)

FOREIGN PATENT DOCUMENTS

| DE | 4217444 | 12/1992 | ........... G06F/12/08 |
| EP | 0473913 | 3/1992 | |
| EP | 0600112 | 6/1994 | ........... G06F/12/14 |
| EP | 0930567 A | 7/1999 | |
| EP | 1 030 237 A | 8/2000 | |

(List continued on next page.)

OTHER PUBLICATIONS

Goldberg, R., "Survey of virtual machine research," IEEE Computer Magazine 7(6), pp. 34–45, 1974.

(List continued on next page.)

*Primary Examiner*—Matthew Kim
*Assistant Examiner*—Stephen C Elmore
(74) *Attorney, Agent, or Firm*—Blakely, Sokoloff, Taylor & Zafman LLP

(57) ABSTRACT

An access transaction generated by a processor is configured using a configuration storage containing a configuration setting. The processor has a normal execution mode and an isolated execution mode. The access transaction has access information. Access to the configuration storage is controlled. An access grant signal is generated using the configuration setting and the access information. The access grant signal indicates if the access transaction is valid.

40 Claims, 13 Drawing Sheets

U.S. PATENT DOCUMENTS

| | | | |
|---|---|---|---|
| 4,366,537 A | 12/1982 | Heller et al. | |
| 4,521,852 A | 6/1985 | Guttag | 364/200 |
| 4,571,672 A | 2/1986 | Hatada et al. | |
| 5,022,077 A | 6/1991 | Bealkowski et al. | 380/4 |
| 5,075,842 A | 12/1991 | Lai | |
| 5,079,737 A | 1/1992 | Hackbarth | |
| 5,255,379 A | 10/1993 | Melo | |
| 5,293,424 A | 3/1994 | Holtey et al. | 380/23 |
| 5,386,552 A * | 1/1995 | Garney | 714/10 |
| 5,421,006 A | 5/1995 | Jablon et al. | 395/575 |
| 5,455,909 A | 10/1995 | Blomgren et al. | |
| 5,459,869 A | 10/1995 | Spilo | |
| 5,473,692 A | 12/1995 | Davis | 380/25 |
| 5,479,509 A | 12/1995 | Ugon | 380/23 |
| 5,568,552 A | 10/1996 | Davis | 380/4 |
| 5,615,263 A | 3/1997 | Takahashi | |
| 5,628,022 A * | 5/1997 | Ueno et al. | 712/37 |
| 5,657,445 A | 8/1997 | Pearce | 395/186 |
| 5,717,903 A | 2/1998 | Bonola | |
| 5,729,760 A | 3/1998 | Poisner | 395/823 |
| 5,737,760 A | 4/1998 | Grimmer, Jr. et al. | |
| 5,757,919 A | 5/1998 | Herbert et al. | |
| 5,764,969 A | 6/1998 | Kahle et al. | |
| 5,796,845 A | 8/1998 | Serikawa et al. | 381/18 |
| 5,805,712 A | 9/1998 | Davis | 380/50 |
| 5,835,594 A | 11/1998 | Albrecht et al. | 380/23 |
| 5,844,986 A | 12/1998 | Davis | 380/4 |
| 5,852,717 A | 12/1998 | Bhide et al. | |
| 5,872,994 A * | 2/1999 | Akiyama et al. | 712/43 |
| 5,890,189 A | 3/1999 | Nozue et al. | |
| 5,937,063 A | 8/1999 | Davis | 380/4 |
| 5,953,502 A | 9/1999 | Helbig, Sr. | |
| 5,978,481 A | 11/1999 | Ganesan et al. | 380/18 |
| 5,987,557 A | 11/1999 | Ebrahim | |
| 6,014,745 A | 1/2000 | Ashe | 713/193 |
| 6,055,637 A | 4/2000 | Hudson et al. | |
| 6,058,478 A | 5/2000 | Davis | 713/191 |
| 6,085,296 A | 7/2000 | Karkhanis et al. | |
| 6,101,584 A | 8/2000 | Satou et al. | |
| 6,125,430 A | 9/2000 | Noel et al. | |
| 6,148,379 A | 11/2000 | Schimmel | |
| 6,158,546 A | 12/2000 | Hanson et al. | 181/255 |
| 6,175,925 B1 | 1/2001 | Nardone et al. | 713/200 |
| 6,178,509 B1 | 1/2001 | Nardone et al. | 713/200 |
| 6,192,455 B1 * | 2/2001 | Bogin et al. | 711/154 |
| 6,205,550 B1 | 3/2001 | Nardone et al. | 713/200 |
| 6,249,872 B1 | 6/2001 | Wildgrube et al. | |
| 6,272,533 B1 | 8/2001 | Browne | |
| 6,282,651 B1 | 8/2001 | Ashe | 713/193 |
| 6,282,657 B1 | 8/2001 | Kaplan et al. | 713/201 |
| 6,292,874 B1 | 9/2001 | Barnett | |
| 6,301,646 B1 | 10/2001 | Hostetter | |
| 6,321,314 B1 | 11/2001 | Van Dyke | |
| 6,339,815 B1 * | 1/2002 | Feng et al. | 711/163 |
| 6,339,816 B1 | 1/2002 | Bausch | |
| 6,499,123 B1 * | 12/2002 | McFarland et al. | 714/724 |
| 6,505,279 B1 * | 1/2003 | Phillips et al. | 711/163 |
| 2001/0021969 A1 | 9/2001 | Burger et al. | |
| 2001/0027527 A1 | 10/2001 | Khidekel et al. | |
| 2001/0003745 A1 | 11/2001 | Metiltski et al. | |

FOREIGN PATENT DOCUMENTS

| | | | |
|---|---|---|---|
| EP | 1146715 | 10/2001 | |
| JP | 2000076139 | 3/2000 | G06F/12/14 |
| WO | WO 97/29567 | 8/1997 | |
| WO | WO9834365 A | 8/1998 | |
| WO | WO9844402 | 10/1998 | |
| WO | WO9905600 | 2/1999 | |
| WO | WO9909482 | 2/1999 | |
| WO | WO9957863 | 11/1999 | |
| WO | WO0217555 | 2/2000 | H04L/9/08 |
| WO | WO0062232 | 10/2000 | |
| WO | WO 01/27723 | 4/2001 | |
| WO | WO 01/27821 | 4/2001 | |
| WO | WO 01/75565 | 10/2001 | |
| WO | WO0175565 | 10/2001 | |
| WO | WO 01/75595 | 10/2001 | |
| WO | WO01175595 | 10/2001 | |
| WO | WO0175564 | 10/2002 | G06F/1/00 |
| WO | WO02086684 | 10/2002 | G06F/1/00 |

OTHER PUBLICATIONS

Gum, P.H., "System/370 Extended Architecture: Facilities for Virtual Machines," IBM J. Research Development, Vol 27, No. 6, pp. 530–544, Nov. 1983.

Rosenblum, M. "Vmware's Virtual Platform: A Virtual Machine Monitor for Commodity PCs," Proceedings of the 11th Hotchips Conference, pp. 185–196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1–31.

"M68040 User's Manual", 1993, Motorola Inc., p. 1–5–p. 1–9, p. 1–13–p. 1–20, p. 2–1–p. 2–3, p. 4–1, p. 8–9–p. 8–11.

"Intel 386 DX Microprocessor 32–BIT CHMOS Microprocessor with Integrated Memory Management", Dec. 31, 1995, Intel Inc., p. 32–56; figure 4–14.

Joe Heinrich:"MIPS R4000 Microprocessor User's Manual", 1994, MIPS Technology Inc., Mountain View, CA, pp. 67–79.

Berg C: "How Do I Create A Signed Applet?", Dr. Dobb's Journal, M&T Publ., Redwood City, CA, US, vol. 22, No. 8, 8 '97, p. 109–111, 122.

Gong L et al: "Going Beyond the Sandbox: An Overview of the New Security Architecture in the JAVA Development Kit 1.2", Proceedings of the USENIX Symposium on Internet Technologies and Systems, Montery, CA 12 '97, pp. 103–112.

J. Heinrich: "MIPS R4000 Microprocessor User's Manual," Apr. 1, 1993, MIPS, MT. View, XP002184449, pp. 61–97.

Compaq Computer Corporation, et al., "Trusted Computing Platform Alliance (TCPA) Main Specification Version 1.1a", (Dec./2001), Title page only.

IBM, "Information Display Technique for a Terminiate Stay Resident Program IBM Technical Disclosure Bulletin", TDB–ACC–No. NA9112156, vol. 34, Issue 7A, (Dec. 1, 1991), 156–158.

Kashiwagi, Kazuhiko, et al., "Design and Implementation of Dynamically Reconstructing System Software", *Software Engineering Conference*, Proceedings 1996 Asia–Pacific Seoul, South Korea Dec 4–7, 1996, Los Alamitos, CA USA, IEEE Comput. Soc, US, ISBN 0–8186–7638–8,(1996), p. 278.

Menezes, Oorschot, "Handbook of Applied Cryptography", *CRC Press LLC, USA XP002201307*, (1997), p. 475.

Sherwood, Timothy, et al., "Patchable Instruction ROM Architecture", *Department of Computer Science and Engineering, University of California, San Diego, La Jolla, CA*, (Nov. 2001), p. 24.

Brands, Stefan, "Restrictive Blinding of Secret–Key Certificates", *Springer–Verlag XP002201306*, (1995), abstract only.

Chen, Andrew A., et al., "Safe and Protected Execution for the Morph/AMRM Reconfigurable Processor", *7th Annual IEEE Symposium, FCCM '99 Proceedings, XP010359180, ISBN 0–7695–0375–6, Los Alamitos, CA*, (Apr. 21, 1999), Abstract only.

Davida, George I., et al., "Defending Systems Against Viruses through Cryptographic Authentication", *Proceedings of the Symposium on Security and Privacy*, IEEE Comp. Soc. Press, ISBN 0–8186–1939–2, (May 1989), Abstract only.

Karger, Paul A., et al., "A VMM Security Kernal for the VAX Architecture", *Proceedings of the Symposium on Research in Security and Privacy*, XP010020182, ISBN 0–8186–2060–9, Boxborough, MA (May 7, 1990), Abstract only.

Luke, Jahn, et al., "Replacement Strategy for Aging Avionics Computers", *IEEE AES Systems Magazine*, XP002190614, (Mar. 1999), Abstract only.

Menezes, Oorschot , "Handbook of Applied Cryptography", *CRC Press LLC, USA XP002201307*, (1997),475.

Richt, Stefan, et al., "In–Circuit–Emulator Wird Echtzeittauglich", *Elektronic, Franzis Verlag GmbH, Munchen, DE*, vol. 40, No. 16, XP000259620, Aug. 6, 1991, Abstract only. In. German.

Robin, John S., et al., "Analysis of the Pentium's Ability to Support a Secure Virtual Machine Monitor", *Proceedings of the 9th Usenix Security Symposium*, XP002247347, Denver, Colorado, (Aug. 14, 2000), 1–17.

Saez, Sergio, et al., "A Hardware Scheduler for Complex Real–Time Systems", *Proceedings of the IEEE International Symposium on Industrial Electronics*, XP002190615, (Jul. 1999), Abstract only.

Sherwood, Timothy, et al., "Patchable Instruction ROM Architecture", *Department of Computer Science and Engineering, University of California San Diego, La Jolla, CA*, (Nov. 2001), p. 24.

\* cited by examiner

CONTROLLING ACCESSES TO ISOLATED MEMORY USING A MEMORY CONTROLLER FOR ISOLATED EXECUTION

RELATED APPLICATIONS

This application is a continuation-in-part of application Ser. No. 09/540,608 filed Mar. 31, 20004, now abandoned.

BACKGROUND

1. Field of the Invention

This invention relates to microprocessors. In particular, the invention relates to processor security.

2. Description of Related Art

Advances in microprocessor and communication technologies have opened up many opportunities for applications that go beyond the traditional ways of doing business. Electronic commerce (E-commerce) and business-to-business (B2B) transactions are now becoming popular, reaching the global markets at a fast rate. Unfortunately, while modern microprocessor systems provide users convenient and efficient methods of doing business, communicating and transacting, they are also vulnerable to unscrupulous attacks. Examples of these attacks include virus, intrusion, security breach, and tampering, to name a few. Computer security, therefore, is becoming more and more important to protect the integrity of the computer systems and increase the trust of users.

Threats caused by unscrupulous attacks may be in a number of forms. Attacks may be remote without requiring physical accesses. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Most anti-virus programs use a weak policy in which a file or program is assumed good until proved bad. For many security applications, this weak policy may not be appropriate. In addition, most anti-virus programs are used locally where they are resident in the platform. This may not be suitable in a group work environment. Security co-processors or smart cards using cryptographic or other security techniques have limitations in speed performance, memory capacity, and flexibility. Redesigning operating systems creates software compatibility issues and causes tremendous investment in development efforts.

BRIEF DESCRIPTION OF THE DRAWINGS

The features and advantages of the present invention will become apparent from the following detailed description of the present invention in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

ARCHITECTURE OVERVIEW

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of privilege, namely, the ability to make changes to the platform. For example, a ring-0 is the innermost ring, being at the highest level of the hierarchy. Ring-0 encompasses the most critical, privileged components. In addition, modules in Ring-0 can also access to lesser privileged data, but not vice versa. Ring-3 is the outermost ring, being at the lowest level of the hierarchy. Ring-3 typically encompasses users or applications level and executes the least trusted code. It is noted that the level of the ring hierarchy is independent to the level of the security protection of that ring.

Figure 1A:
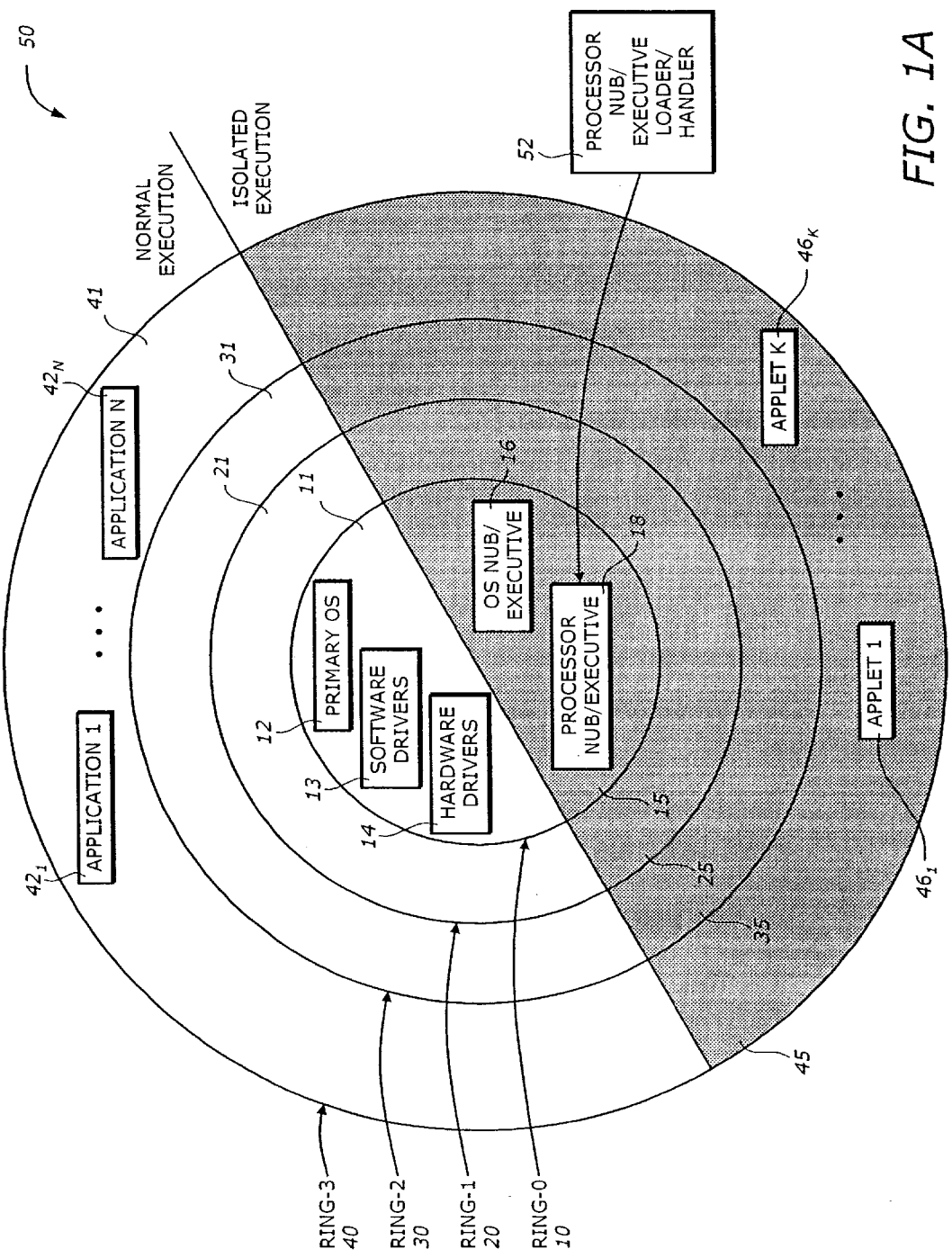
FIG. 1A is a diagram illustrating a logical operating architecture according to one embodiment of the invention.

FIG. 1A is a diagram illustrating a logical operating architecture 50 according to one embodiment of the invention; The logical operating architecture 50 is an abstraction of the components of an operating system and the processor.

The logical operating architecture 50 includes ring-0 10, ring-1 20, ring-2 30, ring-3 40, and a processor nub loader 52. The processor nub loader 52 is an instance of a processor executive (PE) handler. The PE handler is used to handle and/or manage a processor executive (PE) as will be discussed later. The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively. The OSE and the PE are part of executive entities that operate in a secure environment associated with the isolated area 70 and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$ to $42_N$ and isolated execution ring-3 includes K applets $46_1$ to $46_K$.

One concept of the isolated execution architecture is the creation of an isolated region in the system memory, referred to as an isolated area, which is protected by both the processor and chipset in the computer system. Portions of the isolated region may also be in cache memory. Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode when accessing the isolated area. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub loader 52 and processor nub 18 is to verify and load the ring-0 OS nub 16 into the isolated area, and to generate the root of a key hierarchy unique to a combination of the platform, the processor nub 18, and the operating system nub 16. The operating system nub 16 provides links to services in the primary OS 12 (e.g., the unprotected operating system), provides page management within the isolated area, and has the responsibility for loading ring-3 application modules 45, including applets $46_1$ to $46_K$, into protected pages allocated in the isolated area. The operating system nub 16 may also load ring-0 supporting modules.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets $46_1$ to $46_K$ and their data are tamper-resistant and monitor-resistant from all software attacks from other applets, as well as from non-isolated-space applications (e.g., $42_1$ to $42_N$), drivers and even the primary operating system 12. The software that can interfere with or monitor the applet's execution is the processor nub loader 52, processor nub 18 or the operating system nub 16.

Figure 1B:
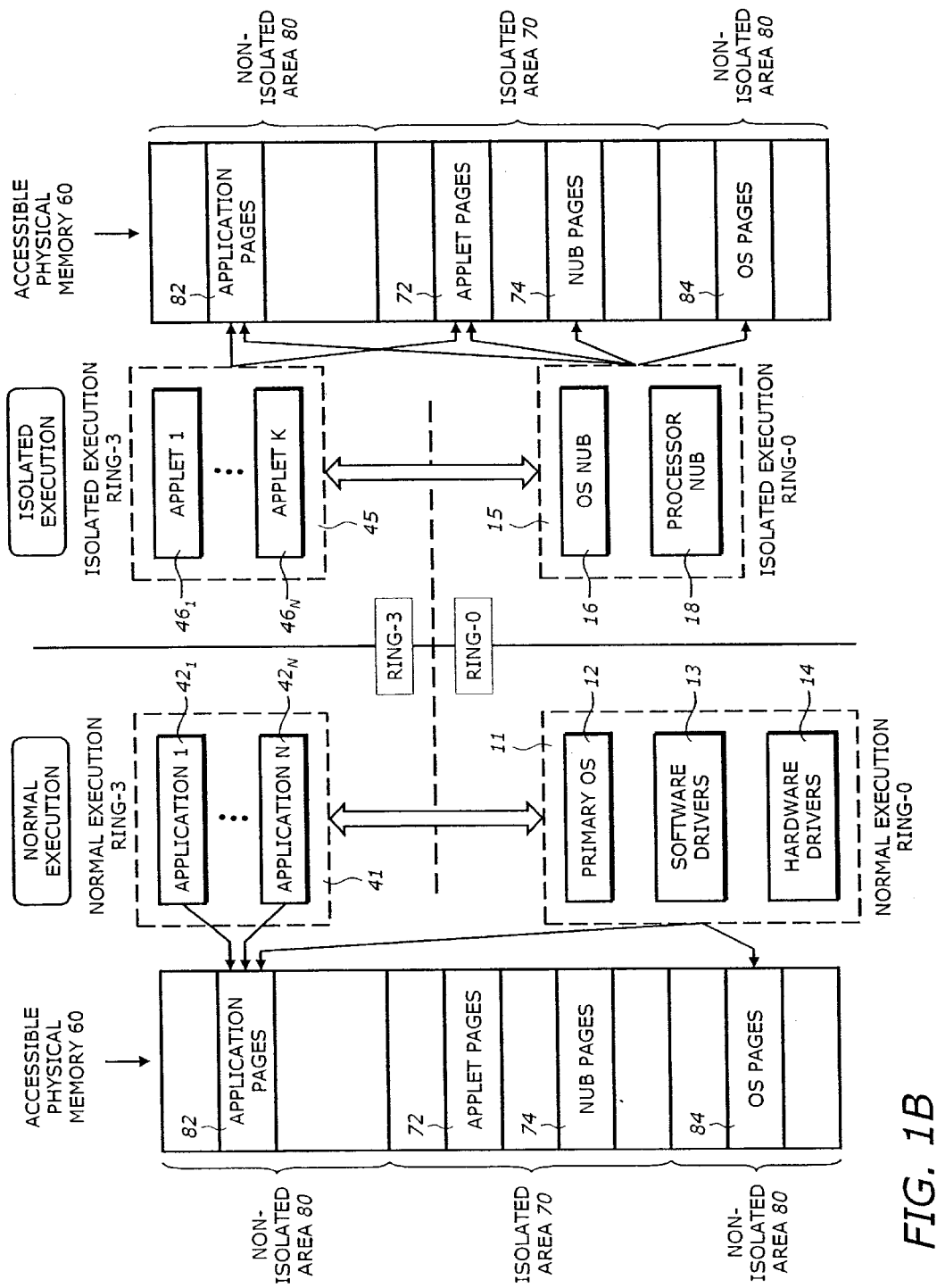
FIG. 1B is a diagram illustrating accessibility of various elements in the operating system and the processor according to one embodiment of the invention.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and to the processor.

The normal execution ring-0 11 including the primary OS 12, the software drivers 13, and the hardware drivers 14, can access both the OS pages 84 and the application pages 82. The normal execution ring-3, including applications $42_1$ to $42_N$, can access only to the application pages 82. Generally applications can only access their own pages, however, the OS typically provides services for sharing memory controlled methods. Both the normal execution ring-0 11 and ring-3 41, however, cannot access the isolated area 70.

The isolated execution ring-0 15, including the OS nub 16 and the processor nub 18, can access to both of the isolated area 70, including the applet pages 72 and the nub pages 74, and the non-isolated area 80, including the application pages 82 and the OS pages 84. The isolated execution ring-3 45, including applets $46_1$ to $46_K$, can access only applet pages 72. The applets $46_1$ to $46_K$ reside in the isolated area 70. In general, applets can only access their own pages; however, the OS nub 16 can also provides services for the applet to share memory (e.g., share memory with other applets or with non-isolated area applications).

Figure 1C:
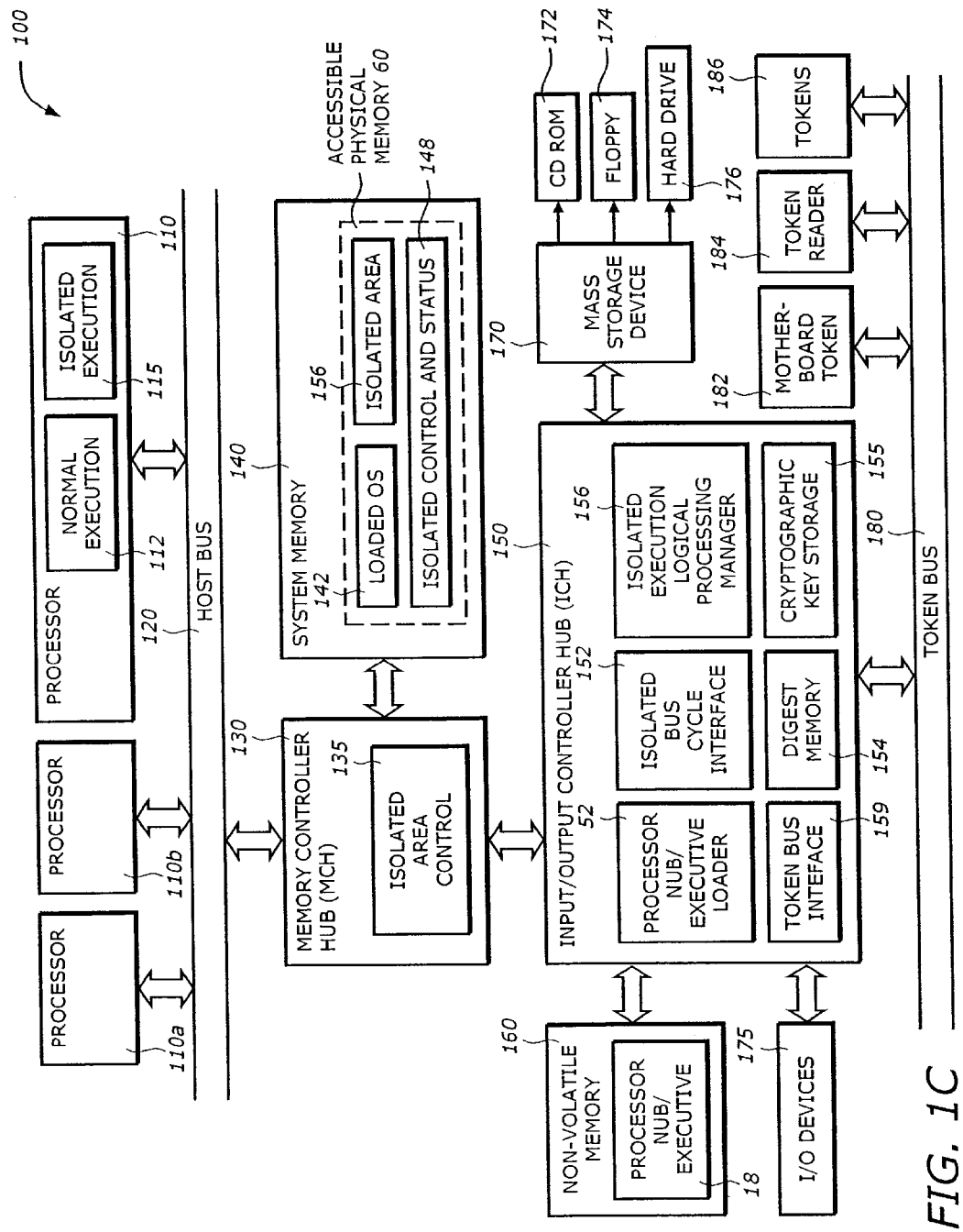
FIG. 1C is a diagram illustrating a computer system in which one embodiment of the invention can be practiced.

FIG. 1C is a diagram illustrating a computer system 100 in which one embodiment of the invention can be practiced. The computer system 100 includes a processor 110, a host bus 120, a memory controller hub (MCH) 130, a system memory 140, an input/output controller hub (ICH) 150, a non-volatile memory, or system flash, 160, a mass storage device 170, input/output devices 175, a token bus 180, a motherboard (MB) token 182, a reader 184, and a token 186. The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc. The "token bus" may be part of the USB bus, e.g., it may be hosted on the USB bus.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the Pentium™ series, the IA-32™ and the IA-64™. The processor 110 includes a normal execution mode 112 and an isolated execution circuit 115. The normal execution mode 112 is the mode in which the processor 110 operates in a non-secure environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area, definition (e.g., decoding and execution) of isolated instructions, generation of isolated access bus cycles, and access checking. In one embodiment, the computer system 100 can be a single processor system, such as a desktop computer, which has only one main central processing unit, e.g. processor 110. In other embodiments, the computer system 100 can include multiple processors, e.g. processors 110, 110a, 110b, etc., as shown in FIG. 1C. Thus, the computer system 100 can be a multi-processor computer system having any number of processors. For example, the multi-processor computer system 100 can operate as part of a server or workstation environment. The basic description and operation of processor 110 will be discussed in detail below. It will be appreciated by those skilled in the art that the basic description and operation of processor 110 applies to the other processors 110a and 110b, shown in FIG. 1C, as well as any number of other processors that may be utilized in the multi-processor computer system 100 according to one embodiment of the present invention.

The processor 110 may also have multiple logical processors. A logical processor is a functional unit within a physical processor having an architectural state and physical resources allocated according to some partitioning policy. A multiprocessor system (e.g., the system comprising the processors 110, 110a, and 110b) may have multiple multilogical processors.

The host bus 120 provides interface signals to allow the processor 110 or processors 110, 100a, and 110b to communicate with other processors or devices, e.g., the MCH 130. In addition to normal mode, the host bus 120 provides an isolated access bus mode with corresponding interface signals for memory read and write cycles. The isolated access bus mode is asserted on memory accesses initiated while the processor 110 is in the isolated execution mode and it is accessing memory within the isolated area. The isolated access bus mode is also asserted on instruction pre-fetch and cache write-back cycles if the address is within the isolated area address range. The isolated access bus mode is configured within the processor 110. The processor 110 responds to a snoop cycle to a cached address when the isolated access bus mode on the FSB matches the mode of the cached address.

The MCH 130 provides control and configuration of system memory 140. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to the isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIG. 1B). The accessible physical memory includes a loaded operating system 142, the isolated area 70 (shown in FIG. 1B), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70, as shown in FIG. 1B, is the memory area that is defined by the processor 110 when operating in the isolated execution mode. Access to the isolated area 70 is restricted and is enforced by the processor 110 and/or the MCH 130 or other chipset that integrates the isolated area functionalities. The isolated control and status space 148 is an input/output (I/O)-like, independent address space defined by the processor 110. The isolated control and status space 148 contains mainly the isolated execution control and status registers. The isolated control and status space 148 does not overlap any existing address space and is accessed using the isolated bus cycles. The system memory 140 may also include other programs or data that are not shown.

The ICH 150 represents a known single point in the system having the isolated execution functionality. For clarity, only one ICH 150 is shown. The system 100 may have many ICH's similar to the ICH 150. When there are multiple ICH's, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, an isolated execution logical processor manager 156, and a token bus interface 159.

The isolated bus cycle interface 152 includes circuitry to interface to the isolated bus cycle signals to recognize and service isolated bus cycles, such as the isolated read and write bus cycles. The processor nub loader 52, as shown in FIG. 1A, includes a processor nub loader code and its digest (e.g., cryptographic hash) value. The processor nub loader 52 is invoked by execution of an appropriate isolated instruction (e.g., Iso_Init) and is transferred to the isolated area 70. From the isolated area 80, the processor nub loader 52 copies the processor nub 18 from the system flash memory (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-resistant and non-substitutable. The digest memory 154, typically implemented in RAM, stores the digest (e.g., cryptographic hash) values of the loaded processor nub 18, the operating system nub 16, and any other supervisory modules (e.g., ring-0 modules) loaded into the isolated execution space. The cryptographic key storage 155 holds a symmetric encryption/decryption key that is unique for the platform of the system 100. In one embodiment, the cryptographic key storage 155 includes internal fuses that are programmed at manufacturing. Alternatively, the cryptographic key storage 155 may also be created during manufacturing with a cryptographic random number generator. The isolated execution logical processor manager 156 manages the operation of logical processors configuring their isolated execution mode support. In one embodiment, the isolated execution logical processor manager 156 includes a logical processor count register that tracks the number of logical processors participating in the isolated execution mode. The token bus interface 159 interfaces to the token bus 180. A combination of the processor nub loader digest, the processor nub digest, the operating system nub digest, and optionally additional digests, represents the overall isolated execution digest, referred to as isolated digest. The isolated digest is a fingerprint identifying the all supervisory code involved in controlling the isolated execution configuration and operation. The isolated digest is used to attest or prove the state of the current isolated execution environment.

The non-volatile memory 160 stores non-volatile information. Typically, the non-volatile memory 160 is implemented in flash memory. In one embodiment, the non-volatile memory 160 includes the processor nub 18. The processor nub 18 provides set-up and low-level management of the isolated area 70 (in the system memory 140), including verification, loading, and logging of the operating system nub 16, and the management of the symmetric key used to protect the operating system nub's secrets. The processor nub loader 52 performs some part of the setup and manages/updates the symmetric key before the processor nub 18 and the OS nub 16 are loaded. The processor nub 18 The processor nub 18 may also provide interface abstractions to low-level security services provided by other hardware. The processor nub 18 may also be distributed by the original equipment manufacturer (OEM) or operating system vendor (OSV).

The mass storage device 170 stores archive information such as code (e.g., processor nub 18), programs, files, data, applications (e.g., applications $42_1$ to $42_N$), applets (e.g., applets $46_1$ to $46_K$) and operating systems. The mass storage device 170 may include compact disk (CD) ROM 172, floppy diskettes 174, and hard drive 176, and any other storage devices. The mass storage device 170 provides a mechanism to read machine-readable media. When implemented in software, the elements of the present invention are the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optical medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an Intranet, etc.

I/O devices 175 may include any I/O devices to perform I/O functions. Examples of I/O devices 175 include a controller for input devices (e.g., keyboard, mouse, trackball, pointing device), media card (e.g., audio, video, graphics), a network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory via the token bus 180.

MANAGING ACCESSES IN ISOLATED EXECUTION MODE

Figure 2A:
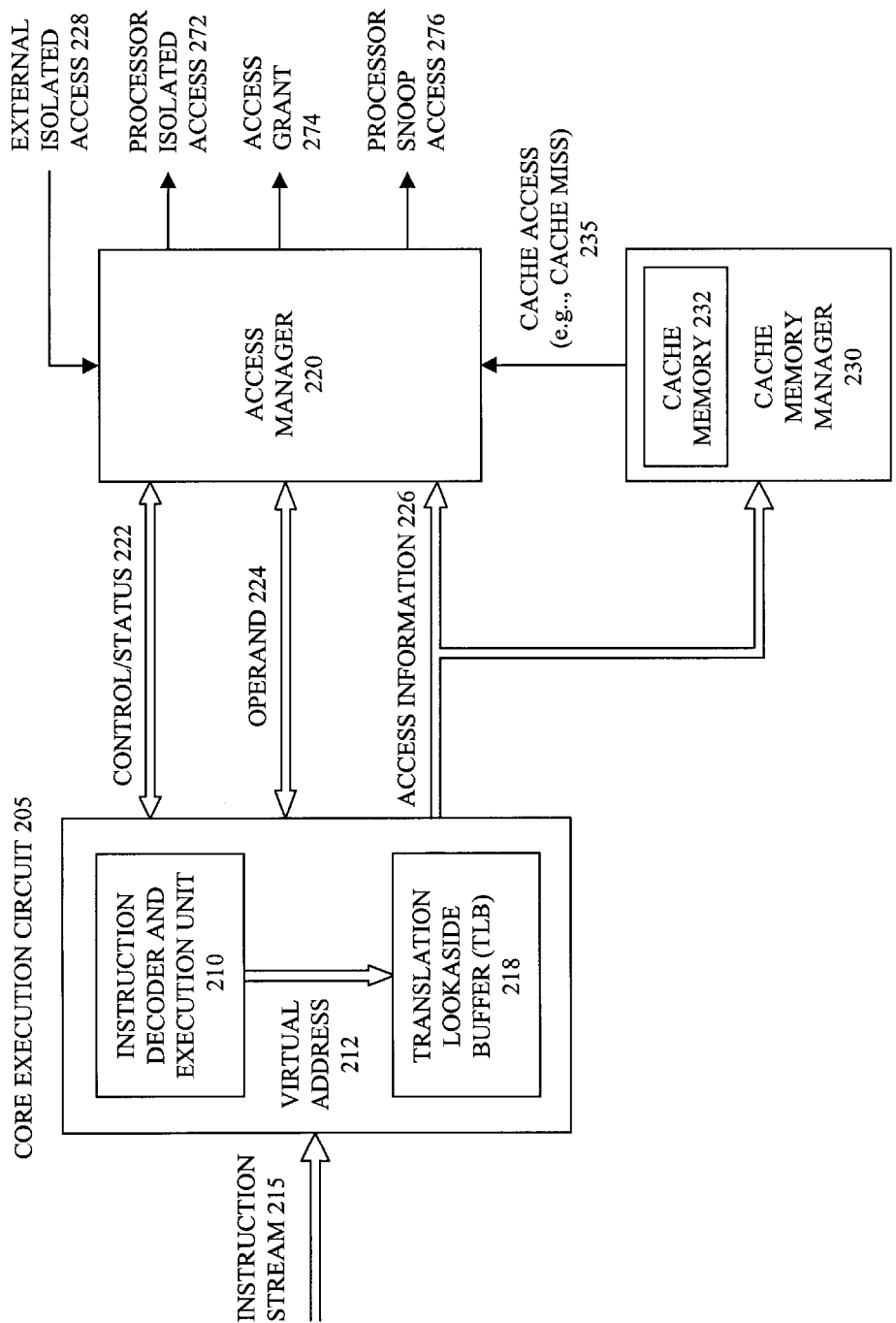
FIG. 2A is a diagram illustrating the isolated execution circuit shown in FIG. 1C according to one embodiment of the invention.

FIG. 2A is a diagram illustrating the isolated execution circuit 115 shown in FIG. 1C according to one embodiment of the invention. The isolated execution circuit 115 includes a core execution circuit 205, an access manager 220, and a cache memory manager 230.

The core execution unit 205 includes an instruction decoder and execution unit 210 and a translation lookaside buffer (TLB) 218. The instruction decoder and execution unit 210 receives an instruction stream 215 from an instruction fetch unit. The instruction stream 215 includes a number of instructions. The instruction decoder and execution unit 210 decodes the instructions and executes the decoded instructions. These instructions may be at the micro- or macro- level. The instruction decoder and execution unit 210 may be a physical circuit or an abstraction of a process of decoding and execution of instructions. In addition, the instructions may include isolated instructions and non-isolated instructions. The instruction decoder and execution unit 210 generates a virtual address 212 when there is an access transaction. The TLB 218 translates the virtual address 212 into a physical address.

The core execution circuit 205 interfaces with the access manager 220 via control/status information 222, operand 224, and access information 226. The control/status information 222 includes control bits to manipulate various elements in the isolated bus cycle generator 220 and status data from the access manager 220. The operand 224 includes data to be written to and read from the access manager 220. The access information 226 includes address (e.g., the physical address provided by the TLB 218), read/write, and access type information.

The access manager 220 receives and provides the control/status information 222, the operand 224, receives the access information 226 from the core execution circuit 205 as a result of instruction execution, receives a cache access signal 235 from the cache memory manager 230, and receives an external isolated access 278 from another processor in the system. The access manager 220 generates an isolated access signal 272, an access grant signal 274, and a processor snoop access signal 276. The isolated access signal 272 may be used to generate an isolated bus cycle 230 sent to devices (e.g., chipsets) external to the processor 110 to indicate that the processor 110 is executing an isolated mode instruction. The processor snoop access signal 276 may be used by other devices or chipsets to determine if a snoop access is a hit or a miss. The isolated access signal 272, the access grant signal 274, and the processor snoop access signal 276 may also be used internally by the processor 110 to control and monitor other isolated or non-isolated activities.

The cache memory manager 230 receives the access information 226 from the core execution circuit 205 and generates the cache access signal 235 to the access manager 220. The cache memory manager 230 includes a cache memory 232 to store cache information and other circuits to manage cache transactions as known by one skilled in the art. The cache access signal 235 indicates the result of the cache access. In one embodiment, the cache access signal 235 is a cache miss signal which is asserted when there is a cache miss from a cache access.

Figure 2B:
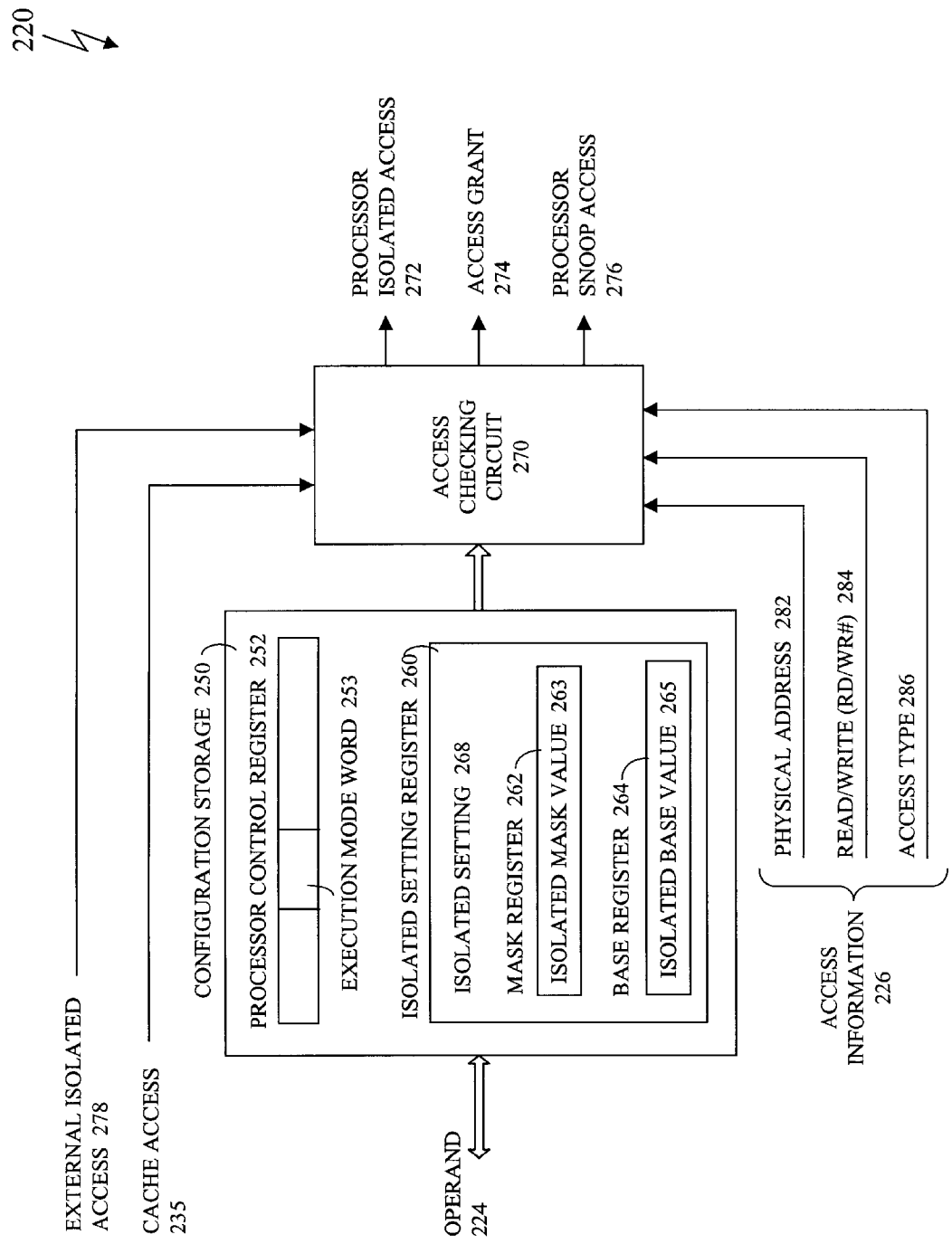
FIG. 2B is a diagram illustrating the access manager shown in FIG. 2A according to one embodiment of the invention.

FIG. 2B is a diagram illustrating the access manager shown in FIG. 2A according to one embodiment of the invention. The access manager 220 includes a configuration storage 250 and an access checking circuit 270. The access manager 220 exchanges operand 224 with and receives the access information 226 from the core execution circuit 205 shown in FIG. 2A. The access manager 220 also receives the cache access signal 235 from the cache manager 230 and the external isolated access 278 from another processor as shown in FIG. 2A. The access information 226 includes a physical address 282; a read/write (RD/WR#) signal 284 and an access type 286. The access information 226 is generated during an access transaction by the processor 110. The access type 286 indicates a type of access, including a memory reference, an input/output (I/O) reference, and a logical processor access. The logical processor access includes a logical processor entry to an isolated enabled state, and a logical processor withdrawal from an isolated enabled state.

The configuration storage 250 contains configuration parameters to configure an access transaction generated by the processor 110. The processor 110 has a normal execution mode and an isolated execution mode. The access transaction has access information. The configuration storage 250 receives the operand 224 from the instruction decoder and execution unit 210 (FIG. 2A) and includes a processor control register 252 and an isolated setting register 260. The processor control register 252 contains an execution mode word 253. The execution mode word 253 is asserted when the processor 110 is configured in the isolated execution mode. In one embodiment, the execution mode word 253 is a single bit indicating if the processor 110 is in the isolated execution mode. The isolated setting register 260 contains an isolated setting 268. The isolated setting 268 defines the isolated memory area (e.g., the isolated area 70 in the system memory 140 shown in FIG. 1C). The isolated setting register 260 includes a mask register 262 and a base register 264. The mask register 262 contains an isolated mask value 263. The base register 264 contains an isolated base value 265. The isolated mask and base values 263 and 265 form the isolated setting 268 and are used to define the isolated memory area.

The access checking circuit 270 checks the access transaction using at least one of the configuration parameters and the access information 226. The access checking circuit 270 generates the isolated access signal 272, the access grant signal 274, and the processor snoop access signal 276 using at least one of the isolated area parameters in the configuration storage 250 and the access information 226 in a transaction generated by the processor 110. The isolated access signal 272 is asserted when the processor 110 is configured in the isolated execution mode. The grant signal 274 is used to indicate if an isolated access has been granted. The processor snoop access signal 276 is used to determine if an isolated access results in a hit or a miss.

Figure 3A:
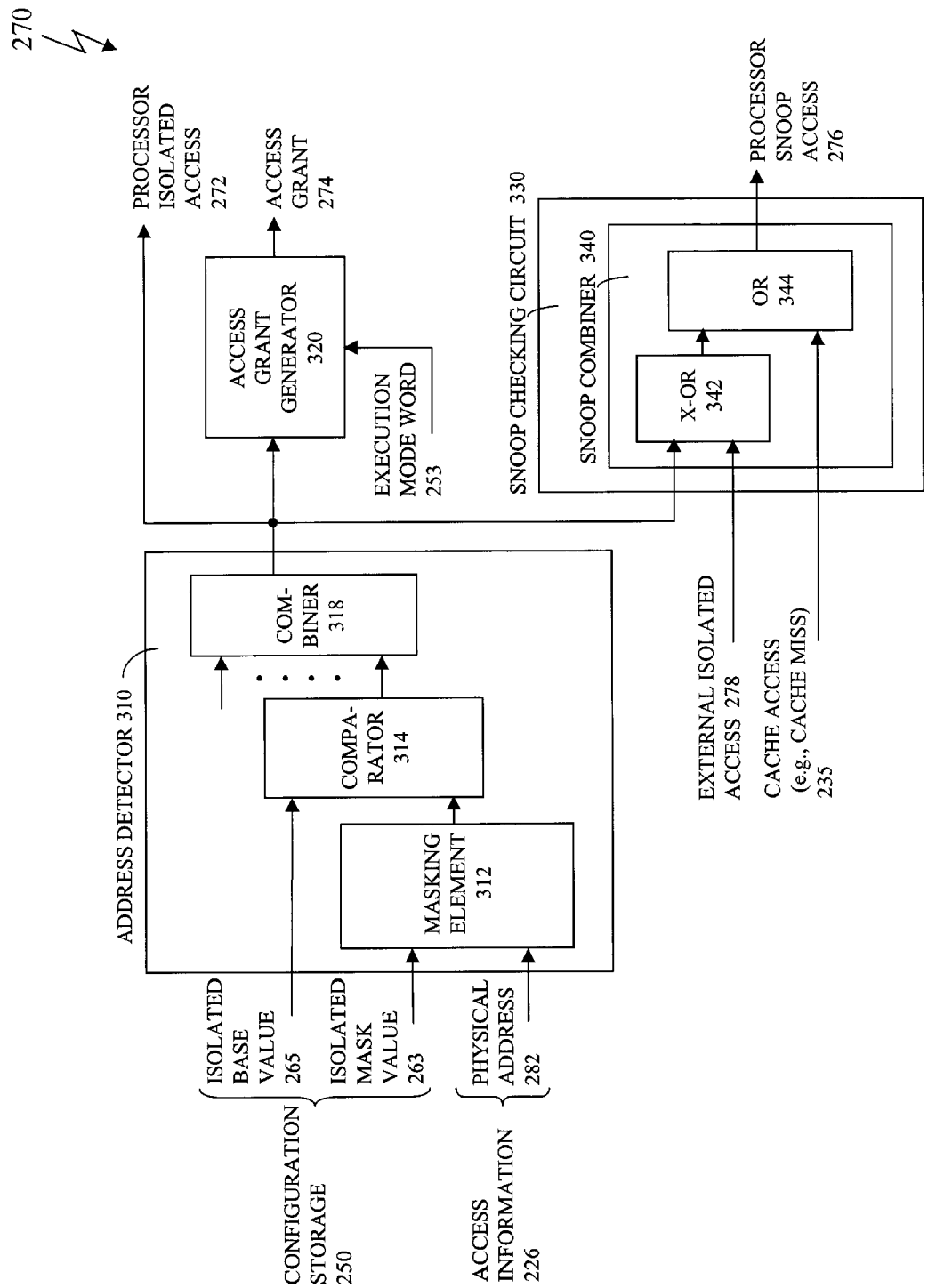
FIG. 3A is a diagram illustrating the access checking circuit to manage snoop accesses according to one embodiment of the invention.

FIG. 3A is a diagram illustrating the access checking circuit 270 to manage snoop accesses according to one embodiment of the invention. The access checking circuit 270 includes an address detector 310, an access grant generator 320, and a snoop checking circuit 330.

The address detector 310 receives the isolated setting 268 (e.g., the isolated mask value 263, the isolated base value 265) from the configuration storage 250 in FIG. 2B. The address detector 310 detects if the physical address 282 is within the isolated memory area defined by the isolated setting 260. The address detector 310 includes a masking element 312, a comparator 314, and a combiner 318. The masking element 312 masks the physical address 282 with the isolated mask value 263. In one embodiment, the masking element 312 performs a logical AND operation. The comparator 314 compares the result of the masking operation done by the masking element 312 and the isolated base value 265, and generates a comparison result. The combiner 318 combines the comparison result with other conditions to generate the isolated access signal 272. The isolated access signal 272 is asserted when the physical address 282 is within the isolated memory area as defined by the isolated mask and base values 263 and 265, respectively, and when other conditions are satisfied. It is noted that the mash could also be used as a length.

The access grant generator 320 combines the isolated access signal 272 and the execution mode word 253 to generate an access grant signal 274. The access grant signal 274 is asserted when both the isolated access signal 272 and the execution mode word 253 are asserted to indicate that an isolated access is valid or allowed as configured. In one embodiment, the access grant generator 320 performs a logical AND operation.

The snoop checking circuit 330 generates the processor snoop access signal 276. The snoop checking circuit 330 includes a snoop combiner 340 to combine the cache access signal 235, the isolated access signal 272, and an external isolated access signal 278 from another processor. The combined cache access signal 235, the isolated access signal 272 and the external isolated access signal 278 correspond to the processor snoop access signal 276. In one embodiment, the snoop combiner 340 includes an exclusive-OR (X-OR) element 342 and an OR element 344. The X-OR element 342 performs an exclusive-OR operation on the isolated access signal 272 and the external isolated access 278. The OR element 344 performs an OR operation on the result of the X-OR element 342 and the cache access signal 235.

Figure 3B:
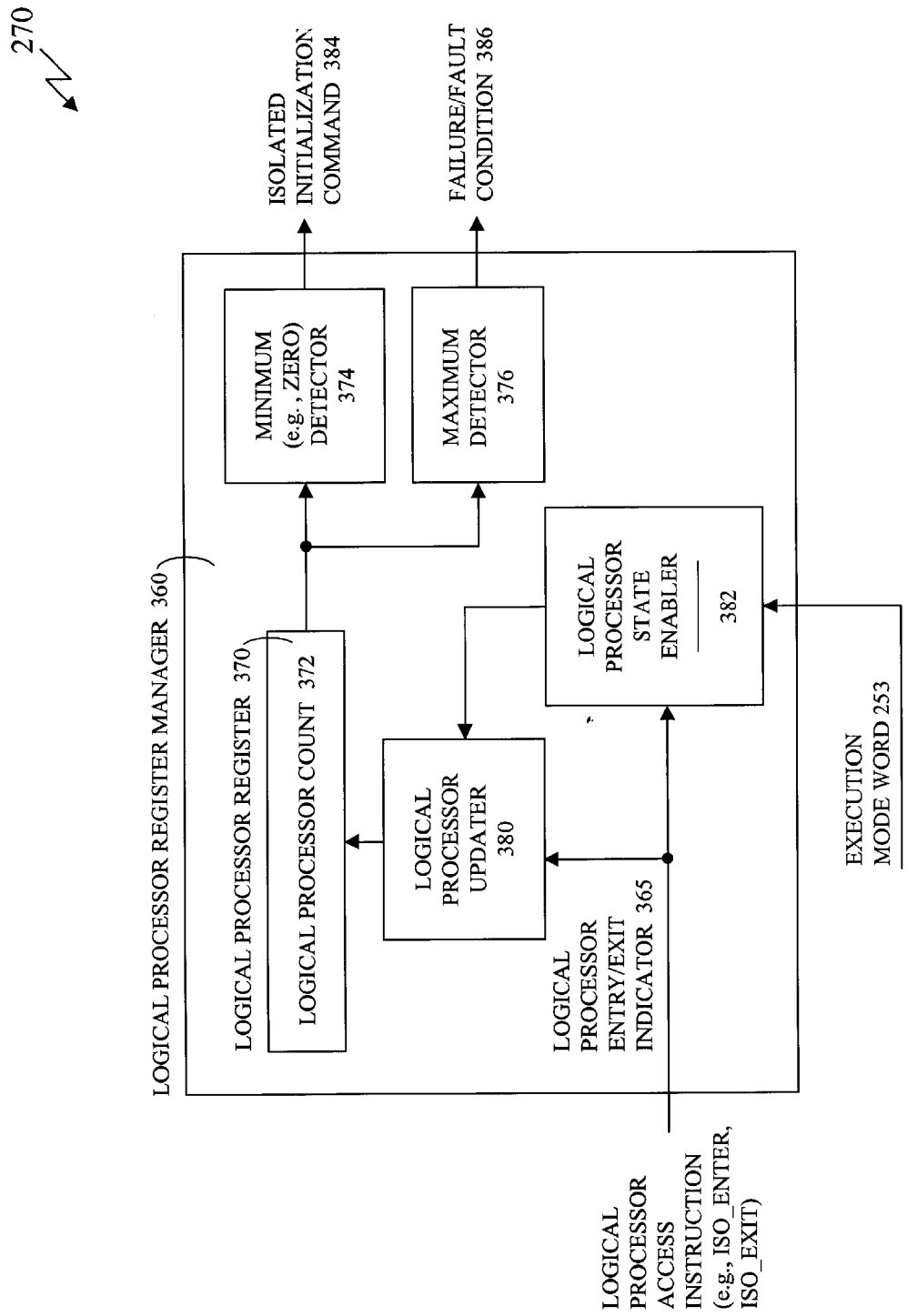
FIG. 3B is a diagram illustrating the access checking circuit to manage logical processor operations according to another embodiment of the invention.

FIG. 3B is a diagram illustrating the access checking circuit 270 to manage logical processor operations according to another embodiment of the invention. The access checking circuit 270 includes a logical processor manager 360.

The logical processor manager 360 manages a logical processor operation caused by the logical processor access. The logical processor manager 360 includes a logical processor register 370, a logical processor state enabler 382, a logical processor updater 380, a minimum detector 374, and a maximum detector 376. The logical processor register 370 stores a logical processor count 372 to indicate a number of logical processors currently enabled. The logical processor state enabler 382 enables a logical processor state when the logical processor access is valid. The logical processor updater 380 updates the logical processor count 372 according to the logical processor access. The logical processor updater 380 is enabled by the enabled logical processor state. The minimum detector 374 determines if the logical processor count 372 is equal to a minimum logical processor value (e.g., zero). The maximum detector 376 determines if the logical processor count 372 exceeds a maximum logical processor value. The maximum logical processor value is a number indicating the maximum number of logical processors that can be supported by the isolated execution mode in the processor 110.

The logical processor updater 380 initializes the logical processor register 370 when there is no enabled logical processor. The logical processor updater 380 updates the logical processor count 372 in a first direction (e.g., incrementing) when the access transaction corresponds to the logical processor entry. The logical processor updater 380 updates the logical processor count 372 in a second direction opposite to the first direction (e.g., decrementing) when the access transaction corresponds to the logical processor exit or a logical processor withdrawal. When the logical processor count 372 is equal to the minimum logical processor value, the logical processor manager 360 causes the processor 110 to initialize or clear (e.g., write back all ISO data to main memory) the cache memory 232 (FIG. 2A) and the isolated setting register (FIG. 2A) from all isolated information. When the logical processor count 372 exceeds the maximum logical processor value, the logical processor manager 360 causes the processor 110 to generate a failure or fault condition.

Figure 4:
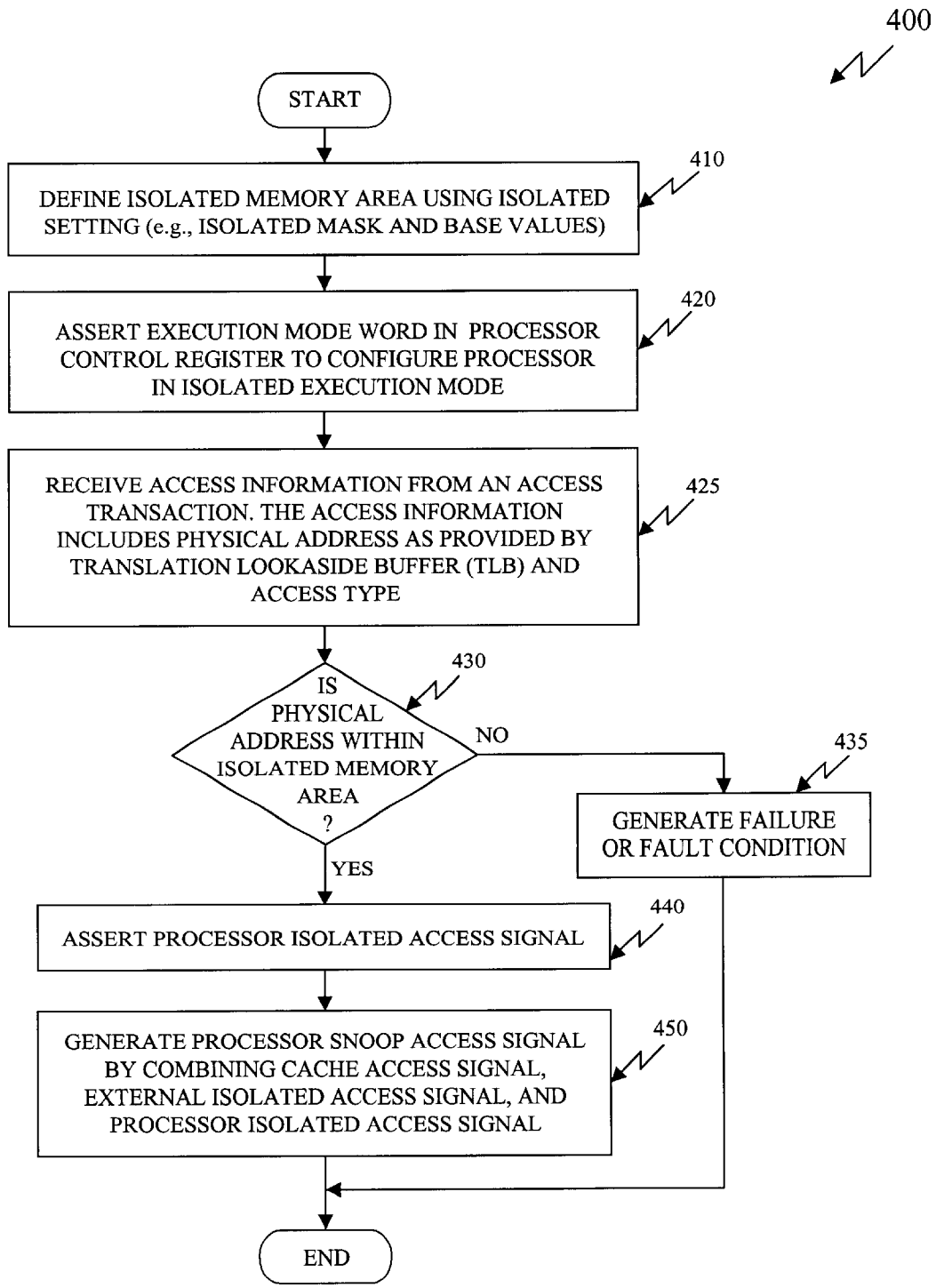
FIG. 4 is a flowchart illustrating a process to manage snoop accesses for isolated execution according to one embodiment of the invention.

FIG. 4 is a flowchart illustrating a process 400 to manage snoop accesses for isolated execution according to one embodiment of the invention.

Upon START, the process 400 defines an isolated memory area using the isolated setting (e.g., isolated mask and base values) (Block 410). Then, the process 400 asserts the execution mode word in the processor control register to configure the processor in the isolated execution mode (Block 420). Next, the process 400 determines if the physical address as generated in a transaction is within the isolated memory area as defined by the isolated setting (Block 430). If not, the process 400 generates a failure or fault condition (Block 435) and is then terminated. Otherwise, the process 400 asserts the isolated access signal (Block 440).

Next, the process 400 generates a processor snoop access signal by combining the cache access signal, the external isolated access signal, and the isolated access signal. Then the process 400 is terminated.

Figure 5:
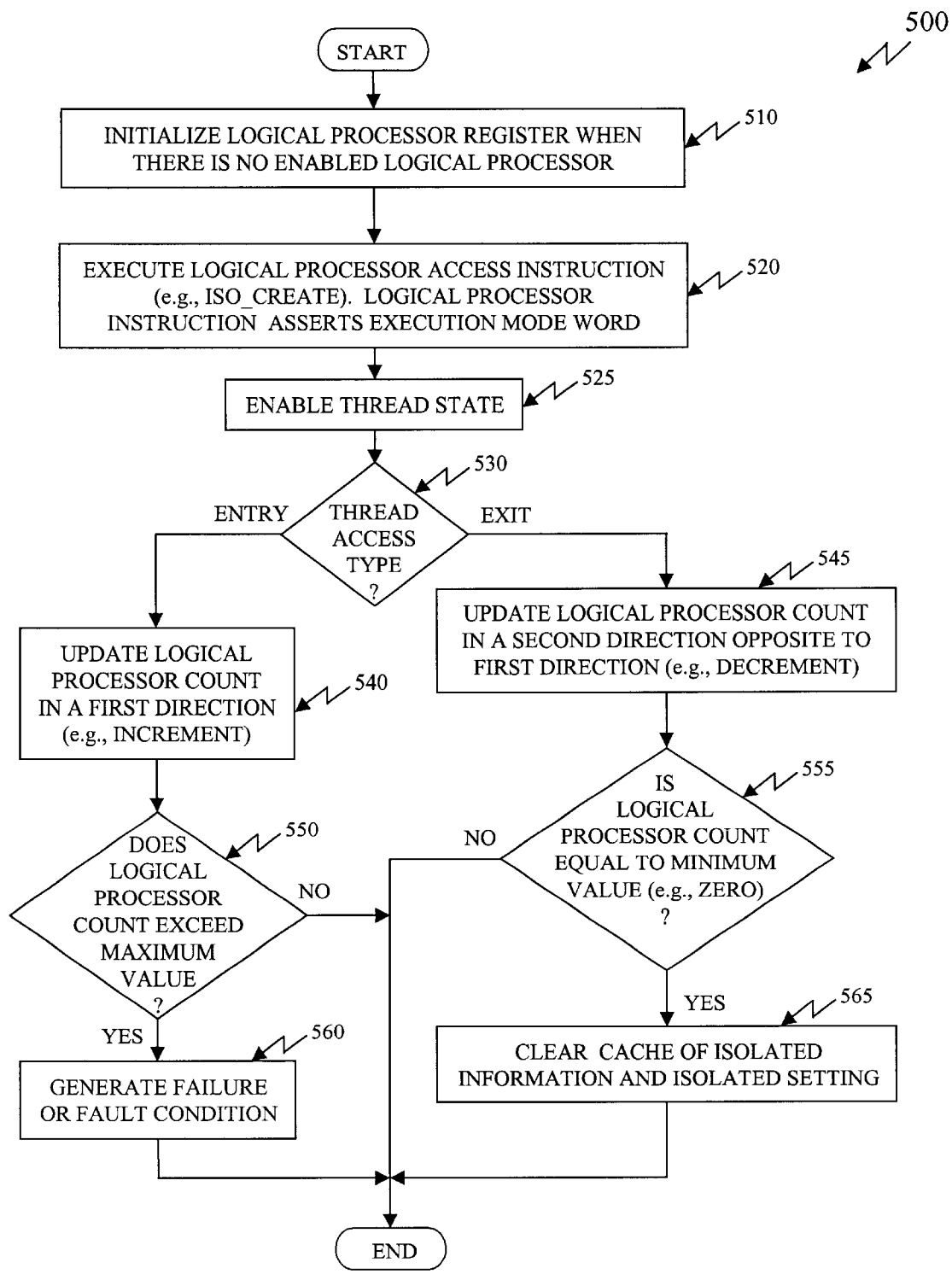
FIG. 5 is a flowchart illustrating a process to manage logical processor operations for isolated execution according to one embodiment of the invention.

FIG. 5 is a flowchart illustrating a process 500 to manage logical processor operations for isolated execution according to one embodiment of the invention.

Upon START, the process 500 initializes the logical processor register when there is no enabled logical processor (Block 510). This is done with ISO_Create. Then the process 500 executes a logical processor access instruction (e.g., iso_create, iso_clear) (Block 520). The logical processor access instruction asserts the execution mode word. Next, the process 500 enables the logical processor state (Block 525). Then, the process 500 determines the logical processor access type (Block 530).

If the logical processor access type is a logical processor entry, the process 500 updates the logical processor count in a first direction (e.g., incrementing) (Block 540). Then, the process 500 determines if the logical processor count exceeds the maximum logical processor value (Block 550). If not, the process 500 is terminated. Otherwise, the process 500 generates a failure or fault condition (Block 560) and is then terminated.

If the logical processor access type is a logical processor exit or logical processor withdrawal, the process 500 updates the logical processor count in a second direction opposite to the first direction (e.g., decrementing) (Block 545). Then, the process 500 determines if the logical processor count is equal to the minimum value (e.g., zero) (Block 555). If not, the process 500 is terminated. Otherwise, the process 500 clears the cache memory and the isolated setting register from all the isolated information (Block 565) and is then terminated.

CONTROLLING ACCESSES TO ISOLATED MEMORY USING A MEMORY CONTROLLER

The above description refers to the isolated execution process in the processor 110. Accesses to the isolated memory area 70 (shown in FIGS. 1B and 1C) are further controlled by the MCH 130 (FIG. 1C). The processor 110 views the MCH 130 as an input/output device mapped into an address location. To have accesses to the isolated memory area 70, the processor 110 needs to configure the memory configuration storage in the MCH 130 accordingly. The MCH 130 also includes control functions to allow the processor 110 to access the memory 140 in non-isolated memory area 80 as well. The MCH 130 receives signals from the processor 110 via the host bus 120 such as the isolated access signal 272 (FIG. 2) or the bus cycle information.

In FIG. 1C, the MCH 130 is shown external to the processor 110. However, it is possible for the MCH 130 to be included inside the processor 110. In this case, a write cycle to the registers in the MCH 130 is externalized to allow any external cache to participate for cache coherency.

In essence, the access controller in the MCH 130 performs a similar function as the access checking circuit 270 shown in FIG. 3A. By maintaining access consistency in both processor 110 and MCH 130, accessing memory can be tightly controlled. The access controller in the MCH 130 determines if an access transaction from the processor 110 is valid. If it is, the access controller returns an access grant signal to allow completion of the access transaction. Otherwise, a failure or fault condition is generated. In addition, the access controller in the MCH 130 also protects any intentional or accidental writing to its own configuration and control storage. Since the MCH 130 is directly interfaced to the memory 140, the access controller also provides initializing contents of the isolated memory area and its own internal storage upon reset.

Figure 6:
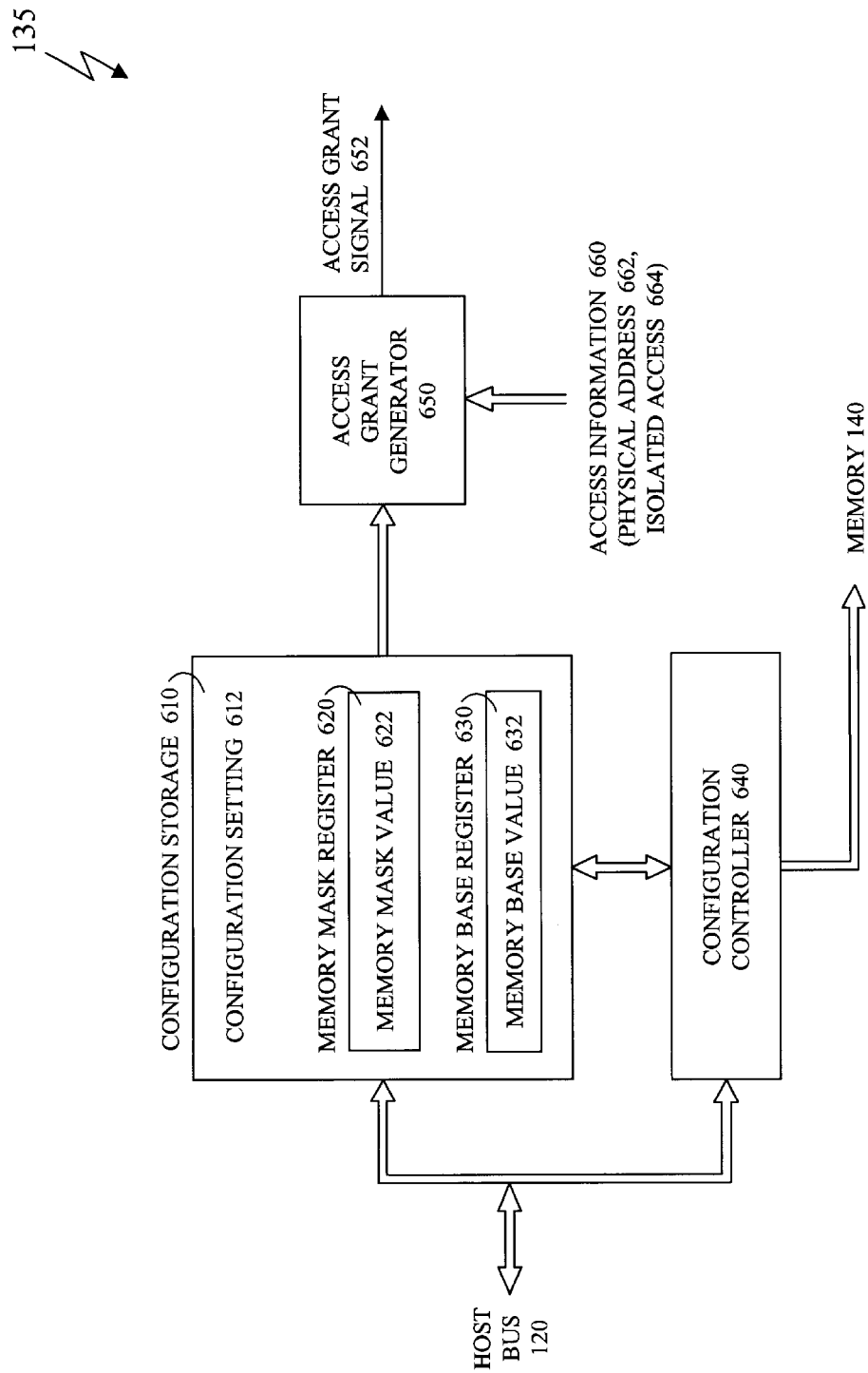
FIG. 6 is a diagram illustrating the isolated area access control in the memory controller hub (MCH) shown in FIG. 1C according to one embodiment of the invention.

FIG. 6 is a diagram illustrating the isolated area access controller 135 in the memory controller hub (MCH) 130 shown in FIG. 1C according to one embodiment of the invention. The access controller 135 includes a configuration storage 610, a configuration controller 640, and an access grant generator 650.

The configuration storage 610 contains a configuration setting 612 to configure an access transaction generated by the processor 110 shown in FIG. 1C. The processor 110 has a normal execution mode and an isolated execution mode. The access transaction has access information 660. The access information 660 is carried over the host bus 120 (FIG. 1C) and includes address information and isolated access state. The address information is represented by a physical address 662. The isolated access state is represented by the isolated access signal 664. The isolated access signal 664 is essentially equivalent to the isolated access signal 272 shown in FIG. 2. The isolated access signal 664 is asserted when the processor 110 generates a valid reference to the isolated memory area 70 (shown in FIG. 1C). The configuration setting 612 includes a memory mask value 622 and a memory base value 632. The memory mask and base values 622 and 632 are the two counterpart values of the isolated mask and base values 263 and 265, respectively, as discussed in connection with FIG. 2. The memory mask and base values 622 and 632 define the isolated memory area 70 in the memory 140 external to the processor 110. As discussed earlier, the isolated memory area 70 is accessible to the processor 110 in the isolated execution mode. The configuration storage 610 includes a memory mask register 620 to store the memory mask value 622 and a memory base register 630 to store the memory base value 632.

The configuration controller 640 controls access to the configuration storage 610 and provides some control functions to the memory 140. The access grant generator 650 generates an access grant signal 652 using the configuration setting 612 and the access information 660. The access grant signal 652 indicates if the access transaction is valid. If the access is not granted, the chipset will return a predetermined data value. This prevents livelock. It also hides the existence of an Isolated Area.

Figure 7:
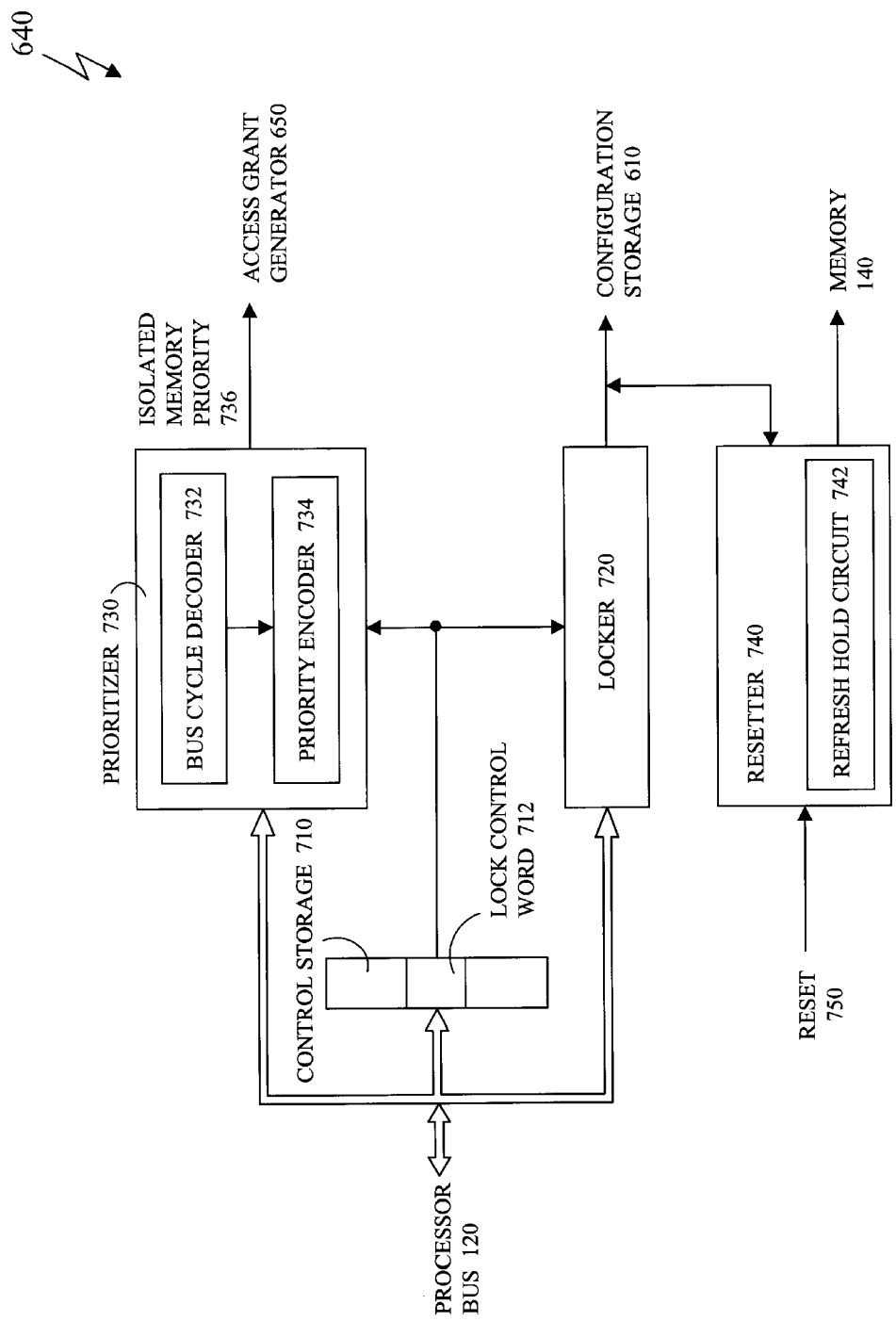
FIG. 7 is a diagram illustrating a configuration controller shown in FIG. 6 according to one embodiment of the invention.

FIG. 7 is a diagram illustrating the configuration controller 640 shown in FIG. 6 according to one embodiment of the invention. The configuration controller 640 includes a control storage 710, a locker 720, a prioritizer 730, and a resetter 740.

The control storage 710 is interfaced to the host bus 120 to receive and store a lock control word 712. The lock control word 712 indicates if the isolated memory area is enabled. Typically the lock control word 712 is written by the processor nub 18 when it is invoked to enable or initialize the isolated memory area 70. The lock control word 712 may be a single bit to indicate if locking is desired. Locking is an operation to prevent a storage from being overwritten by an inadvertent or intentional write operation by other devices.

The locker 720 locks access to the configuration storage 610 based on the lock control word 712. When the lock control word 712 is asserted (e.g., the lock control bit is set in enable state), the locker 720 protects the configuration storage 610 from being written or modified. The locker 720 disallows updates to the MCH control registers. The locker 720 can be implemented in a number of ways. In one method, the locker may be a gating element (e.g., an OR gate for a positive logic) to gate the read/ write signal (R/W#) from the processor with the lock control word 712. When the lock control word 712 is asserted high, the write function is disabled, inhibiting a write to the configuration storage 610.

The prioritizer 730 prioritizes the access transaction based on the lock control word 712. This prioritization allows the memory mask and base values 622 and 632 to take precedence over any other memory decoding. In other words, all addressing in the configured isolated memory area and control registers is handled by the MCH 130 regardless of whether there is memory backing this range or not. Other configuration registers such as top of memory, memory hole registers will not violate this requirement because of the locker 720. This prioritization ensures that code residing in the non-isolated memory area (e.g., area 80 in the memory 140 shown in FIG. 2B) cannot alter the top of memory, memory range, or memory hole settings to make contents of the isolated memory area 70 disappear or move. In one embodiment, the prioritizer 730 includes a bus cycle decoder 732 and a priority encoder 734. The bus cycle decoder 732 decodes the bus cycle from the bus cycle signals as generated by the processor 110. The bus cycle may be one of a normal and special bus cycle. The normal bus cycle corresponds to the normal execution mode. The special bus cycle corresponds to the isolated execution mode. Examples of the special bus cycle include a read/ write data access cycle, a read/write control access cycle, a logical processor entry cycle, and a logical processor withdrawal cycle. The priority encoder 734 encodes the decoded bus cycle as enabled by the lock control word 712. The prioritizer 730 generates an isolated memory priority signal 736 to the access grant generator 650. It is not memory access that gets priority. It is the locker that prevents changes to the configuration registers.

The resetter 740 initializes the isolated memory area 70, the configuration storage 610, and the control storage 710 upon reset. The resetter 740 includes a write circuit to write initial values (e.g., all zero's, all one's, a constant) to all memory, the configuration storage 610, and the control storage 710 when a reset is triggered.

Figure 8:
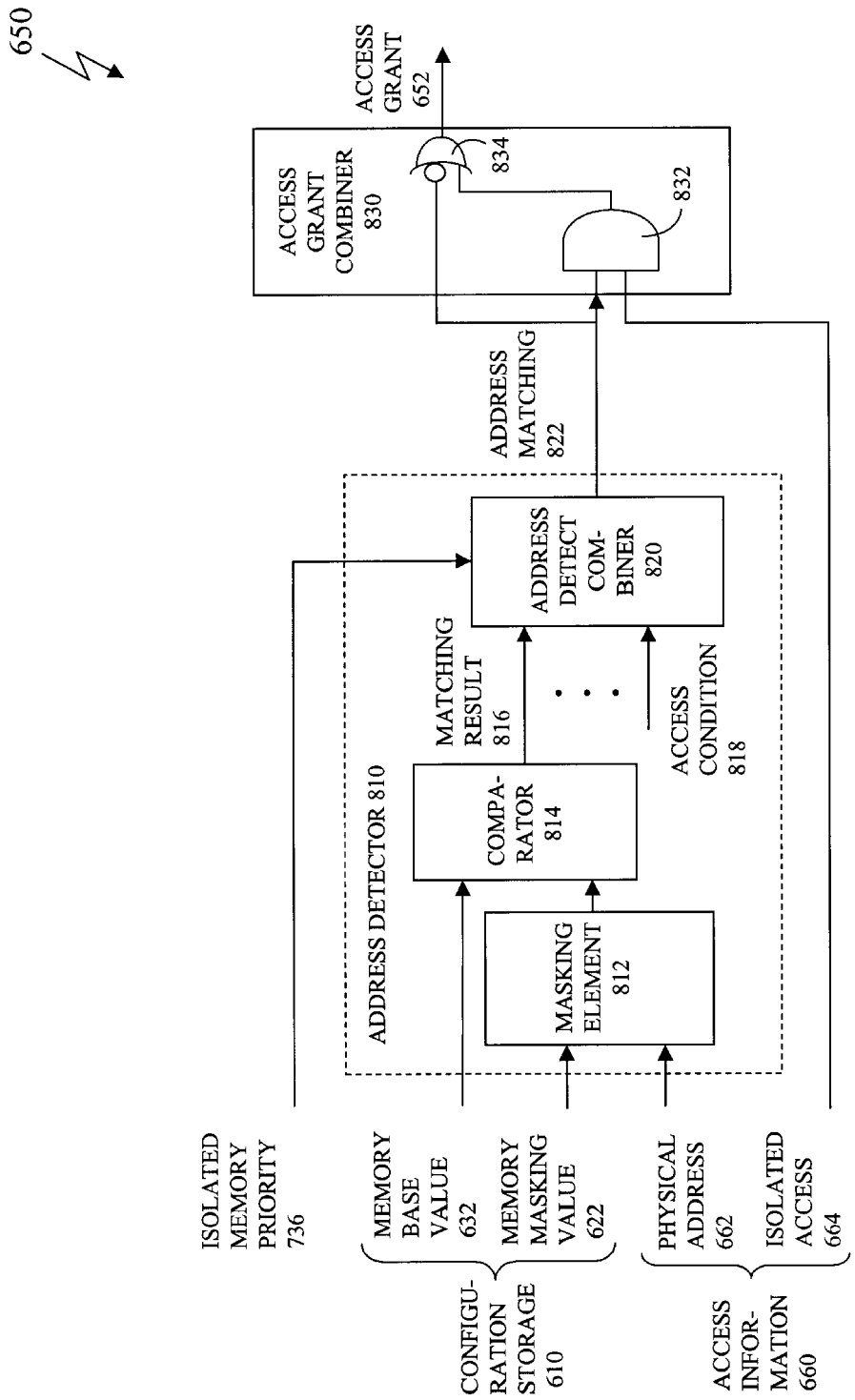
FIG. 8 is a diagram illustrating an access grant generator shown in FIG. 6 according to one embodiment of the invention.

FIG. 8 is a diagram illustrating the access grant generator 650 shown in FIG. 6 according to one embodiment of the invention. The access grant generator 650 includes an address detector 810 and an access grant combiner 820.

The address detector 810 detects if the physical address 652 is within the isolated memory area 70. The address detector 810 generates an address matching signal 822. The address detector 810 includes a masking element 812, a comparator 814, and an address detect combiner 820. The masking element 812 masks the physical address 652 with the memory masking value 622. In one embodiment, the masking element 812 implements an AND operation. The comparator 814 compares the masked physical address with the memory base value 632. The comparator 814 generates a matching result 816 corresponding to the address matching signal 822. The address detect combiner 820 combines the matching result 816 with at least one access condition 818. The combined matching result 816 and the at least one access condition 818 provides the address matching signal 822. In addition, the address detect combiner 820 may also be gated or enabled by the isolated memory priority signal 736 as generated by the prioritizer 730 shown in FIG. 7.

The access grant combiner 830 combines the address matching signal 822 (from the address detector 810) and the isolated access signal 664 (from the access information 660) to generate the access grant signal 652. The access grant combiner 830 ensures that a matched physical address is accompanied by a valid processor reference to the isolated memory area as indicated by the isolated access signal 664.

Figure 9:
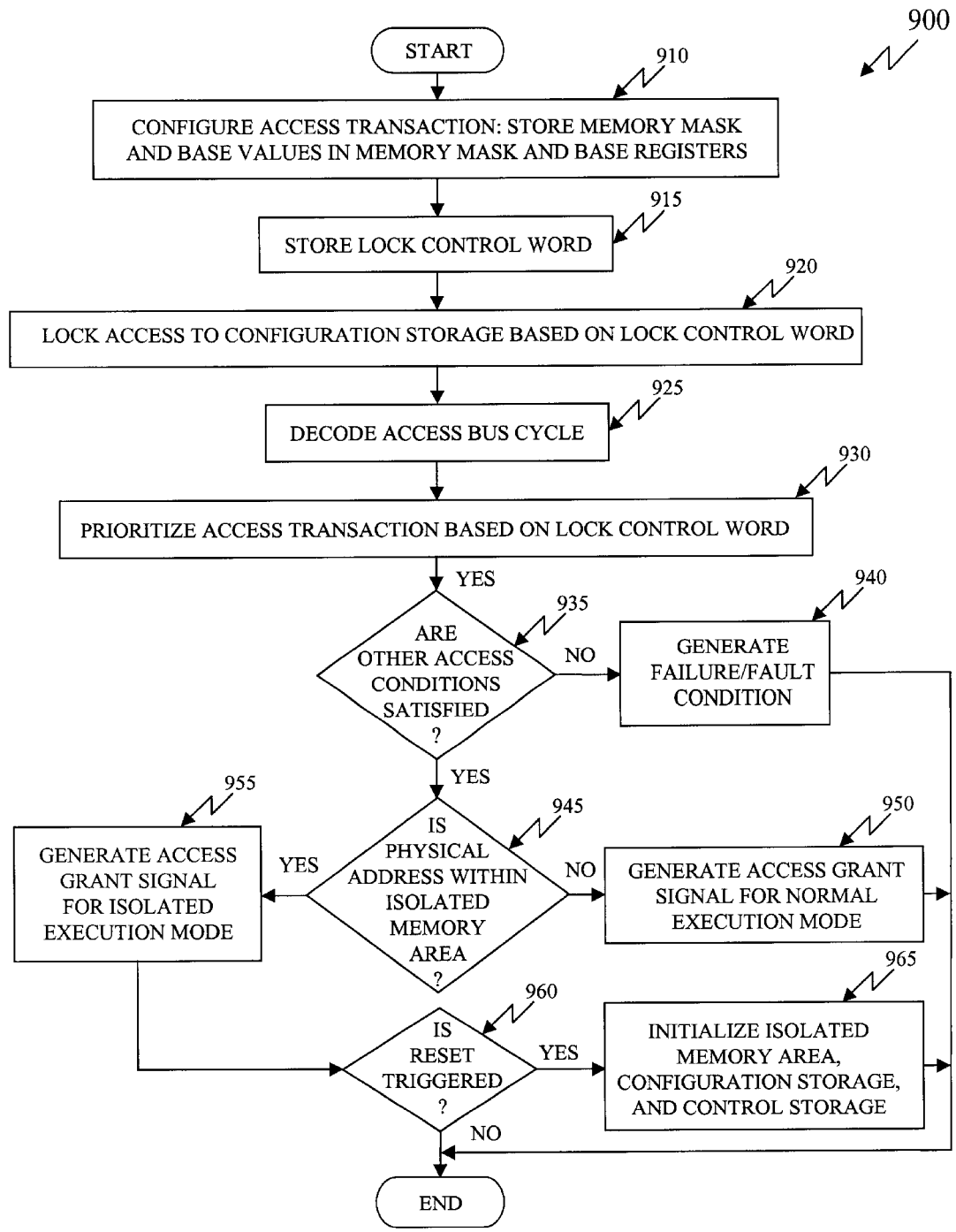
FIG. 9 is a flowchart illustrating a process to control access to memory according to one embodiment of the invention.

FIG. 9 is a flowchart illustrating a process 900 to control access to memory according to one embodiment of the invention.

Upon START, the process 900 configures the access transaction in the MCH (Block 910). This configuration includes writing configuration setting into the configuration storage, e.g., storing memory mask and base values in memory mask and base registers. Next, the process 900 configures access control to the configuration storage (Block 915) by storing the lock control word in the control storage. The process 900 then locks access to the configuration storage based on the lock control word (Block 920). The lock control block could prevent any accesses to the configuration. Therefore, all accesses to the configuration after lock are faults.

Next, the process 900 receives an access transaction from the processor and decodes the access bus cycle (Block 925) and prioritizes the access transaction based on the lock control word (Block 930). Then, the process 900 determines if other access conditions are satisfied (Block 935). If not, the process 900 generates a failure or fault condition (Block 940) and is then terminated. Otherwise, the process determines if the physical address is within the isolated memory area as defined by the memory mask and base values (Block 945). If not, the process 900 generates an access grant signal for normal execution mode (Block 950) and is then terminated. Otherwise, the process 900 generates an access grant for isolated execution mode (Block 955). This includes generating an address matching signal indicating if the physical address is within the isolated memory area, and combining the address matching signal and the isolated access signal to generate the access grant signal. Generating the address matching signal includes masking the physical address with the memory masking value and comparing the masked physical address with the memory base value to generate a matching result.

Next, the process 900 determines if a reset is triggered (Block 960). If not, the process 900 is terminated. Otherwise, the process 900 initializes the isolated memory area, the configuration storage, and the control storage (Block 965). The process 900 is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a configuration storage containing a configuration setting to configure an access transaction generated by a processor having a normal execution mode and an isolated execution mode, the access transaction having access information;
    a configuration controller coupled to the configuration storage to control access to the configuration storage; and
    an access grant generator coupled to the configuration storage to generate an access grant signal using the configuration setting and the access information, the access grant signal indicating if the access transaction is valid.

2. The apparatus of claim 1 wherein the configuration setting includes a memory mask value and a memory base value, the memory mask and base values defining an isolated memory area in a memory external to the processor, the isolated memory area being accessible to the processor in the isolated execution mode.

3. The apparatus of claim 2 wherein the configuration storage comprises:
    a memory mask register to store the memory mask value; and
    a memory base register to store the memory base value.

4. The apparatus of claim 3 wherein the access information includes a physical address and an isolated access state, the isolated access state being provided by an isolated access signal, the isolated access signal being asserted when the processor generates a valid reference to the isolated memory area.

5. The apparatus of claim 4 wherein the configuration controller comprises:
    a control storage to store a lock control word, the lock control word indicating if the isolated memory area is enabled; and
    a locker to lock access to the configuration storage based on the lock control word.

6. The apparatus of claim 5 wherein the configuration controller further comprises:
    a prioritizer to prioritize the access transaction based on the lock control word.

7. The apparatus of claim 6 wherein the configuration controller further comprises:
    a resetter to initialize the isolated memory area, the configuration storage, and the control storage upon reset.

8. The apparatus of claim 7 wherein the access grant generator comprises:
    an address detector to detect if the physical address is within the isolated memory area, the address detector generating an address matching signal; and
    an access grant combiner coupled to the address detector to combine the address matching signal and the isolated access signal, the combined address matching signal and the isolated access signal corresponding to the access grant signal.

9. The apparatus of claim 8 wherein the address detector comprises:
    a masking element to mask the physical address with the memory masking value; and
    a comparator to compare the masked physical address with the memory base value, the comparator generating a matching result corresponding to the address matching signal.

10. The apparatus of claim 9 wherein the address detector further comprises:
    an address detect combiner to combine the matching result with at least one access condition, the combined matching result and the at least one access condition providing the address matching signal.

11. A method comprising:
    configuring an access transaction generated by a processor having a normal execution mode and an isolated execution mode using a configuration storage containing a configuration setting, the access transaction having access information;
    controlling access to the configuration storage; and
    generating an access grant signal using the configuration setting and the access information, the access grant signal indicating if the access transaction is valid.

12. The method of claim 11 wherein the configuration setting includes a memory mask value and a memory base value, the memory mask and base values defining an isolated memory area in a memory external to the processor, the isolated memory area being accessible to the processor in the isolated execution mode.

13. The method of claim 12 wherein configuring the access transaction comprises:
    storing the memory mask value in a memory mask register; and
    storing the memory base value in a memory base register.

14. The method of claim 13 wherein the access information includes a physical address and an isolated access state, the isolated access state being provided by an isolated access signal, the isolated access signal being asserted when the processor generates a valid reference to the isolated memory area.

15. The method of claim 14 wherein controlling access to the configuration storage comprises:
    storing a lock control word, the lock control word indicating if the isolated memory area is enabled; and
    locking access to the configuration storage based on the lock control word.

16. The method of claim 15 wherein controlling access to the configuration storage further comprises:
  prioritizing the access transaction based on the lock control word.

17. The method of claim 16 wherein controlling access to the configuration storage further comprises:
  initializing the isolated memory area, the configuration storage, and the control storage upon reset.

18. The method of claim 17 wherein generating the access grant signal comprises:
  generating an address matching signal indicating if the physical address is within the isolated memory area; and
  combining the address matching signal and the isolated access signal, the combined address matching signal and the isolated access signal corresponding to the access grant signal.

19. The method of claim 18 wherein generating the address matching signal comprises:
  masking the physical address with the memory masking value; and
  comparing the masked physical address with the memory base value to generate a matching result corresponding to the address matching signal.

20. The method of claim 19 wherein generating the address matching signal further comprises:
  combining the matching result with at least one access condition, the combined matching result and the at least one access condition providing the address matching signal.

21. A computer program product comprising:
  a machine readable medium having computer program code therein, the computer program product comprising:
    computer readable program code for configuring an access transaction generated by a processor having a normal execution mode and an isolated execution mode using a configuration storage containing a configuration setting, the access transaction having access information;
    computer readable program code for controlling access to the configuration storage; and
    computer readable program code for generating an access grant signal using the configuration setting and the access information, the access grant signal indicating if the access transaction is valid.

22. The computer program product of claim 21 wherein the configuration setting includes a memory mask value and a memory base value, the memory mask and base values defining an isolated memory area in a memory external to the processor, the isolated memory area being accessible to the processor in the isolated execution mode.

23. The computer program product of claim 22 wherein the computer readable program code for configuring the access transaction comprises:
  computer readable program code for storing the memory mask value in a memory mask register; and
  computer readable program code for storing the memory base value in a memory base register.

24. The computer program product of claim 23 wherein the access information includes a physical address and an isolated access state, the isolated access state being provided by an isolated access signal, the isolated access signal being asserted when the processor generates a valid reference to the isolated memory area.

25. The computer program product of claim 24 wherein the computer readable program code for controlling access to the configuration storage comprises:
  computer readable program code for storing a lock control word, the lock control word indicating if the isolated memory area is enabled; and
  computer readable program code for locking access to the configuration storage based on the lock control word.

26. The computer program product of claim 25 wherein the computer readable program code for controlling access to the configuration storage further comprises:
  computer readable program code for prioritizing the access transaction based on the lock control word.

27. The computer program product of claim 26 wherein the computer readable program code for controlling access to the configuration storage further comprises:
  computer readable program code for initializing the isolated memory area, the configuration storage, and the control storage upon reset.

28. The computer program product of claim 27 wherein the computer readable program code for generating the access grant signal comprises:
  computer readable program code for generating an address matching signal indicating if the physical address is within the isolated memory area; and
  computer readable program code for combining the address matching signal and the isolated access signal, the combined address matching signal and the isolated access signal corresponding to the access grant signal.

29. The computer program product of claim 28 wherein the computer readable program code for generating the address matching signal comprises:
  computer readable program code for masking the physical address with the memory masking value; and
  computer readable program code for comparing the masked physical address with the memory base value to generate a matching result corresponding to the address matching signal.

30. The computer program product of claim 29 wherein the computer readable program code for generating the address matching signal further comprises:
  computer readable program code for combining the matching result with at least one access condition, the combined matching result and the at least one access condition providing the address matching signal.

31. A system comprising:
  a processor having a normal execution mode and an isolated execution mode;
  a memory coupled to the processor having an isolated memory area accessible to the processor in the isolated execution mode; and
  a chipset coupled to the memory having an access controller, the access controller comprising:
    a configuration storage containing a configuration setting to configure an access transaction generated by the processor, the access transaction having access information,
    a configuration controller coupled to the configuration storage to control access to the configuration storage, and
    an access grant generator coupled to the configuration storage to generate an access grant signal using the configuration setting and the access information, the access grant signal indicating if the access transaction is valid.

32. The system of claim 31 wherein the configuration setting includes a memory mask value and a memory base value, the memory mask and base values defining the isolated memory area in the memory.

33. The system of claim 32 wherein the configuration storage comprises:

a memory mask register to store the memory mask value; and a memory base register to store the memory base value.

34. The system of claim 33 wherein the access information includes a physical address and an isolated access state, the isolated access state being provided by an isolated access signal, the isolated access signal being asserted when the processor generates a valid reference to the isolated memory area.

35. The system of claim 34 wherein the configuration controller comprises:

a control storage to store a lock control word, the lock control word indicating if the isolated memory area is enabled; and a locker to lock access to the configuration storage based on the lock control word.

36. The system of claim 35 wherein the configuration controller further comprises:

a prioritizer to prioritize the access transaction based on the lock control word.

37. The system of claim 36 wherein the configuration controller further comprises:

a resetter to initialize the isolated memory area, the configuration storage, and the control storage upon reset.

38. The system of claim 37 wherein the access grant generator comprises:

an address detector to detect if the physical address is within the isolated memory area, the address detector generating an address matching signal; and an access grant combiner coupled to the address detector to combine the address matching signal and the isolated access signal, the combined address matching signal and the isolated access signal corresponding to the access grant signal.

39. The system of claim 38 wherein the address detector comprises:

a masking element to mask the physical address with the memory masking value; and a comparator to compare the masked physical address with the memory base value, the comparator generating a matching result corresponding to the address matching signal.

40. The system of claim 39 wherein the address detector further comprises:

an address detect combiner to combine the matching result with at least one access condition, the combined matching result and the at least one access condition providing the address matching signal.

* * * * *